United States Patent
Min et al.

(10) Patent No.: US 7,327,228 B2
(45) Date of Patent: Feb. 5, 2008

(54) INSTALLATION AND MAINTENANCE METHOD AND SYSTEM FOR MAINTAINING A CONTROL MODULE FOR REMOTE STARTER AND ALARM SYSTEM FOR VEHICLES

(76) Inventors: Byung Woo Min, 2001Manistee Dr., La Canada, CA (US) 91011; Jim Speers, 812 Lorne Crescent, St, Albert, Alberta (CA) T6N2R5

( * ) Notice: Subject to any disclaimer, the term of this patent is extended or adjusted under 35 U.S.C. 154(b) by 156 days.

(21) Appl. No.: 11/032,612

(22) Filed: Jan. 10, 2005

(65) Prior Publication Data

US 2006/0156298 A1    Jul. 13, 2006

(51) Int. Cl.
B60R 25/10    (2006.01)

(52) U.S. Cl. .............. 340/426.1; 340/426.13; 340/426.14; 340/539.11; 340/539.19; 340/825.69; 180/167; 180/173; 701/29

(58) Field of Classification Search .......... 340/426.1, 340/426.13, 426.14, 539.1, 539.11, 539.19, 340/825.69, 825.72; 701/28, 29; 717/168, 717/174; 180/167, 173
See application file for complete search history.

(56) References Cited

U.S. PATENT DOCUMENTS

| | | | |
|---|---|---|---|
| 5,337,013 A * | 8/1994 | Langer et al. .............. 324/537 |
| 5,884,202 A * | 3/1999 | Arjomand .................... 701/29 |
| 6,184,779 B1 | 2/2001 | Chan | |
| 6,452,483 B2 | 9/2002 | Chan et al. | |
| 6,608,554 B2 * | 8/2003 | Lesesky et al. ............. 340/431 |
| 6,700,479 B2 | 3/2004 | Birchfield | |
| 6,728,603 B2 * | 4/2004 | Pruzan et al. .................. 701/1 |
| 7,050,795 B2 * | 5/2006 | Wiegand et al. ............ 455/419 |

* cited by examiner

*Primary Examiner*—Hung Nguyen
(74) *Attorney, Agent, or Firm*—John K. Park; Park Law Firm

(57) ABSTRACT

An installation and maintenance method for maintaining a control module for remote starter and alarm system for vehicles includes the steps of plugging in a signal converter onto the control module, establishing an electronic connection between the control module and a first information processing device, obtaining a control information for the control module, and applying the control information on the control module. The signal converter includes a serial to wireless converter and the first information processing device includes a personal digital assistant (PDA). The method can further includes the steps of establishing a connection between the first information processing device and a second information processing device through a communication network and downloading an information from the second information processing device. A remote installation and maintenance system includes an information processing device, a communication network, and a server. The system installs and maintains the control module of the system.

6 Claims, 2 Drawing Sheets

INSTALLATION AND MAINTENANCE METHOD AND SYSTEM FOR MAINTAINING A CONTROL MODULE FOR REMOTE STARTER AND ALARM SYSTEM FOR VEHICLES

BACKGROUND OF THE INVENTION

The present invention relates to a remote installation and maintenance system for remote starter and alarm system for vehicles. More particularly, this invention relates to a remote installation and maintenance system for remote starter and alarm system for vehicles, which greatly increases the ability of an installer to test and debug the installation and operation of the remote starter/alarm systems.

It is not a new thing to apply the latest achievements in the state-of-the-art engineering areas such as mechanics, electronics, automation, computer, and communication to automobile.

The car is not only an alternative to a horse or feet, but far beyond a means of transportation. Since its advent, the automobile has prompted an unprecedented change in recreation pattern of humans, a birth of metropolitan area, and many other fundamental winds of change. The daily innovation in automobile industry is not the news any more. Thanks to that, an automobile driver can perform a lot of things without leaving her or his driver seat. The driver can shut/open the trunk and windows, adjust the angle of mirrors, and most of all start the car and monitor the security of the car remotely.

There exist many controllers for different functions. The installation and maintenance of those controllers is not a simple thing as the number and the complexity of them keep increasing with time. Especially in the case of remote start device or alarm system, the situation is so complicated to make the automobile industry think about a kind of controller of controller.

Accordingly, a need for an installation and maintenance method for maintaining a control module for remote starter and alarm system for vehicles has been present for a long time. This invention is directed to solve these problems and satisfy the long-felt need.

SUMMARY OF THE INVENTION

The present invention contrives to solve the disadvantages of the prior art.

An objective of the invention is to provide an installation and maintenance method for maintaining a control module for remote starter and alarm system for vehicles.

Another objective of the invention is to provide an installation and maintenance method, which installs and maintains the information of the control module remotely and in expedite and convenient ways.

Still another objective of the invention is to provide a remote installation and maintenance system, which installs and maintains for remote starter and alarm system for vehicles.

An installation and maintenance method for maintaining a control module for remote starter and alarm system for vehicles includes the steps of establishing an electronic connection between the control module and a first information processing device, obtaining a control information for the control module, and applying the control information on the control module.

The method further includes a step of plugging in a signal converter onto the control module. The signal converter includes a serial to wireless converter, and the first information processing device includes a personal digital assistant (PDA).

The step of obtaining a control information includes the step of retrieving the control information from the first information processing device, in which the control information includes firmware and/or software for the control module.

The step of applying the control information on the control module includes a step of installing the control information on the control module, or a step of performing a test routine on the control module.

The method further includes a step of disengaging the electronic connection between the control module and the first information processing device.

The step of installing the control information on the control module includes the steps of checking the version and the compatibility of the control information.

The step of obtaining a control information includes the steps of establishing a connection between the first information processing device and a second information processing device through a communication network, and downloading an information from the second information processing device. The second information processing device includes a server, and the communication network includes an internet. The first information processing device verifies the operation of input and output functions of the control module.

The first information processing device provides operating modes of test-and-debug, option programming, and firmware-and-software upgrades.

The mode of test-and-debug allows monitoring the status of the inputs to the control module. The the status of the inputs to the control module includes information on opening parts, braking parts, and ignition parts of the vehicle. The inputs further include information on a safe start device and an alarm.

The mode of test-and-debug also allows controlling the outputs from the control module. The outputs from the control module include the information on ignition, starter, accessories, park lights, horn, and ground out when running.

The mode of test-and-debug further allows monitoring the tachometer signal and identifying a reliable tachometer signal source on the vehicle.

The mode of remote technical support allows a remote technician to perform operations directly on the control module of the vehicle through the communication network and the first and second information processing devices. The control parameters of the control module are adjusted remotely. The outputs includes information on lock, unlock, park lights, ignition, horn, and an information on the tachometer set point.

The mode of option programming allows programming the options and features of the system according to the type of vehicle. The options and features are stored as a configuration file either locally in the first information processing device or to the server through the communication network.

With the off-connection to the control module, the mode of option programming provides selection routine for passing the control of the mode to the program mode screen, passing the control of the mode to the diagnostics mode and input screen, connecting the system to the control module. The program mode provides error checking and vehicle dependent programming options.

With the on-connection to the control module the mode of option programming provides selection routine for retrying to connect in case of unsuccessful connection, passing the control of the mode to the diagnostics mode and input screen, connecting the system to the control module. In the diagnostic mode and input screen the control module provides the processing device with the status options about the opening parts, braking parts, starting parts, and safety parts.

A remote installation and maintenance system, which installs and maintains for remote starter and alarm system for vehicles, in which the remote starter and alarm system comprises a control module, includes an information processing device, a communication network, and a server. The information processing device is for connecting the control module in the vehicle and the server through the communication network, control, and program the flow of the information in-between.

The remote installation and maintenance system further includes a serial to wireless converter installable to the control module, in which the serial to wireless converter enables the information processing device to communicate with the control module.

The new system greatly increases the ability of an installer to test and debug the installation and operation of a remote starter and remote starter/alarm systems. It allows an installer to quickly verify the operation of all input and output functions. It can also be used to quickly set all the options and features that are user configurable on the system. The ability of the installer to connect to the internet through a wireless link gives him the ability to download the latest firmware for vehicles from a central site. He can also store and retrieve vehicle profiles from a central computer. If necessary a technical support representative from headquarters can even interact with the vehicle remotely.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

Figure 1:
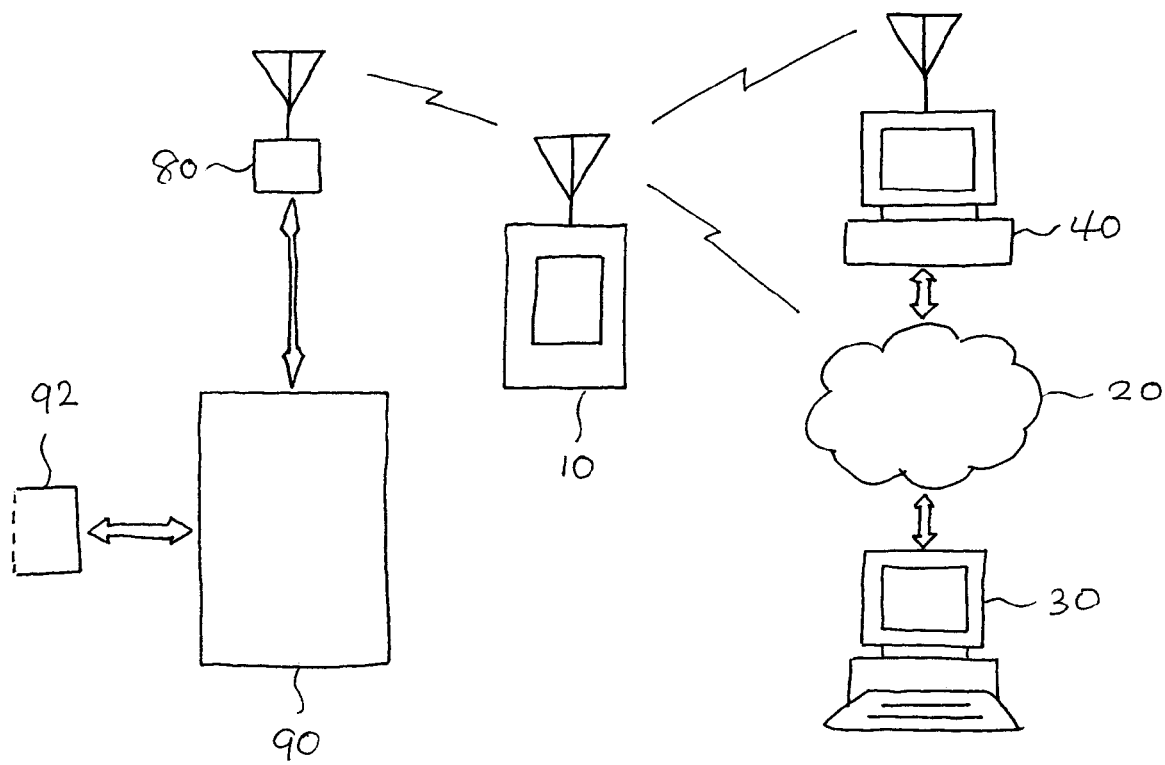
FIG. 1 is a perspective view of the method and system according to the invention.
Figure 2:
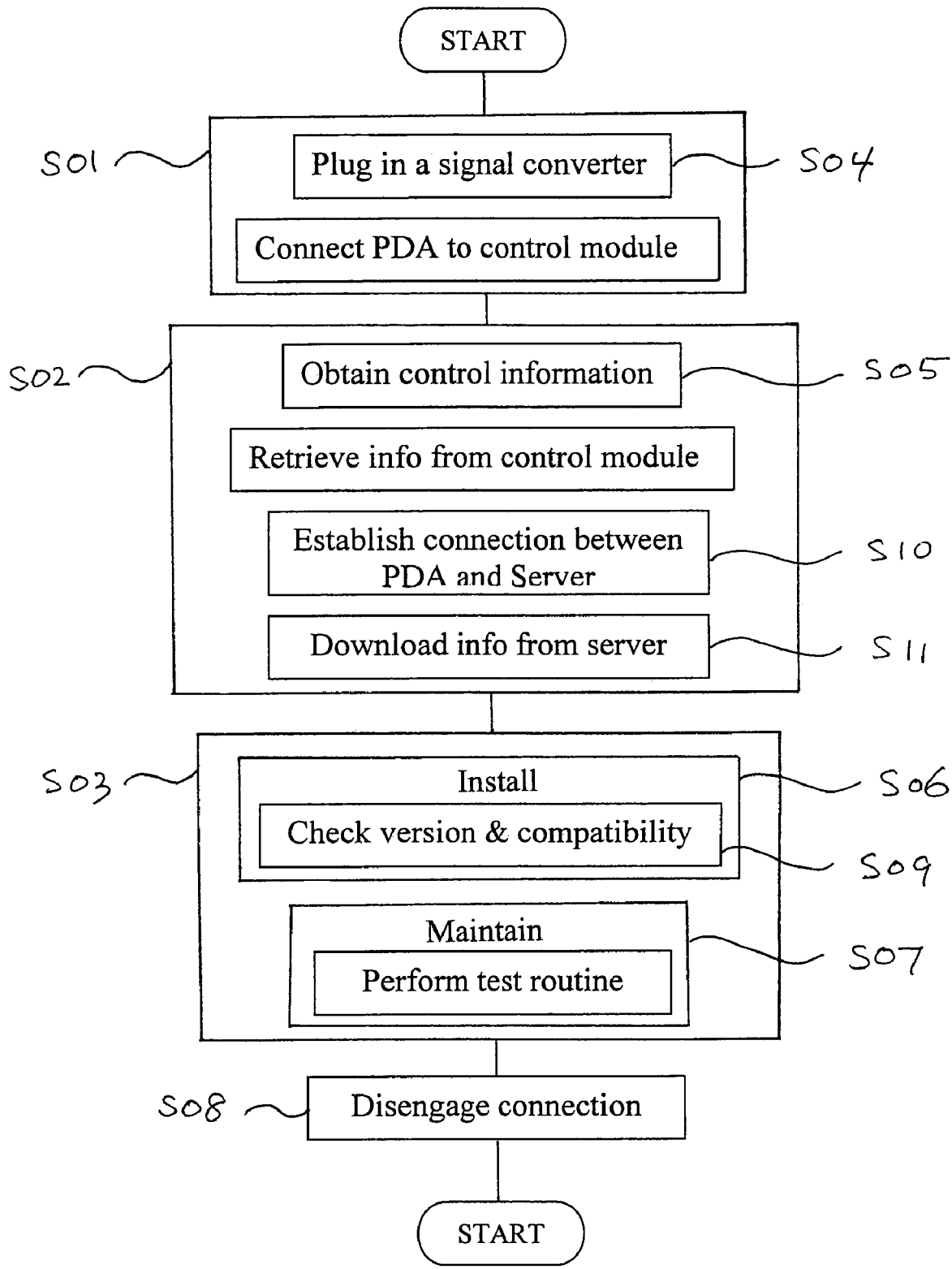
FIG. 2 is a schematic flow chart for installation and maintenance method of the invention.

FIG. 1 shows a perspective view of devices used for the method and system of the invention. FIG. 2 shows a flow chart installation and maintenance method of the invention.

An installation and maintenance method for maintaining a control module 90 for remote starter or alarm system (not shown) for vehicles (not shown) includes step S01 of establishing an electronic connection between the control module 90 and a first information processing device 10, step S02 of obtaining a control information for the control module 90, and step S03 of applying the control information on the control module 90 as schematically shown in FIG. 2. The control module 90 exchanges information including status data and control information with a vehicle input and output port 92, which is connected to the remote starter or alarm system.

The step S01 includes a step S04 of plugging in a signal converter 80 onto the control module 90. The signal converter 80 includes a serial to wireless converter, and the first information processing device 10 includes a personal digital assistant (PDA) device, or other personal computing devices such as a personal computer or notebook computer which has the required functions as the first information processing device 10.

The step S02 of obtaining a control information includes the step S05 of retrieving the control information from the first information processing device 10, in which the control information includes firmware and/or software for the control module 90.

The step S03 of applying the control information on the control module 90 includes a step S06 of installing the control information on the control module 90.

Alternatively, the step S03 of applying the control information on the control module 90 includes a step S07 of performing a test routine on the control module 90.

The method further includes a step S08 of disengaging the electronic connection between the control module 90 and the first information processing device 10.

The step S06 of installing the control information on the control module 90 includes the step S09 of checking the version and the compatibility of the control information.

The step S02 of obtaining a control information includes the step S10 of establishing a connection between the first information processing device 10 and a second information processing device 30 through a communication network 20, and step S11 of downloading an information from the second information processing device 30. The second information processing device 30 includes a server, and the communication network 20 includes an internet. The first information processing device 10 verifies the operation of input and output functions of the control module 90. A server can work as the second information processing device 30. Also, a regular personal computer 40 can perform the same role.

The first information processing device 10 provides operating modes of test-and-debug, option programming, and firmware-and-software upgrades.

The mode of test-and-debug allows monitoring the status of the inputs to the control module 90. The status of the inputs to the control module 90 includes information on opening parts, braking parts, and ignition parts of the vehicle. The inputs further include information on a safe start device and an alarm.

The mode of test-and-debug also allows controlling the outputs from the control module 90. The outputs from the control module 90 include the information on ignition, starter, accessories, park lights, horn, and ground out when running.

The mode of test-and-debug further allows monitoring the tachometer signal and identifying a reliable tachometer signal source on the vehicle.

The mode of remote technical support allows a remote technician to perform operations directly on the control module 90 of the vehicle through the communication network 20 and the first and second information processing devices 10, 30. The control parameters of the control module 90 are adjusted remotely. The outputs includes information on lock, unlock, park lights, ignition, horn, and an information on the tachometer set point.

The mode of option programming allows programming the options and features of the system according to the type of vehicle. The options and features are stored as a configuration file either locally in the first information processing device 10 or to the server through the communication network 20.

With the off-connection to the control module 90, the mode of option programming provides selection routine for passing the control of the mode to the program mode screen, passing the control of the mode to the diagnostics mode and input screen, connecting the system to the control module 90. The program mode provides error checking and vehicle dependent and customizable programming options.

With the on-connection to the control module 90 the mode of option programming provides selection routine for retrying to connect in case of unsuccessful connection, passing the control of the mode to the diagnostics mode and input screen, connecting the system to the control module 90. In the diagnostic mode and input screen the control module 90 provides the processing device with the status options about the opening parts, braking parts, starting parts, and safety parts.

The information on opening parts of the vehicle includes information on hood pin and door pin. The information on braking parts of the vehicle includes information on brake pedal and emergency brake. The information on ignition parts of the vehicle includes information on glow plug.

The mode of firmware-and-software upgrades allows upgrading the firmware and software for the control module 90 from the first information processing device 10 or from the second information processing device 30 through the communication network 20. The first information processing device 10 prevents downloading of firmware that is incompatible with the control module 90 for the system in the vehicle. The software for the first information processing device 10 itself and the firmware for a new model of vehicle are updated with the information from the second information processing device 30 through the communication network 20.

A remote installation and maintenance system, which installs and maintains for remote starter and alarm system for vehicles, in which the remote starter and alarm system comprises a control module 90, includes an information processing device 10, a communication network 20, and a server 30.

The information processing device 10 is for connecting the control module 90 in the vehicle and the server 30 through the communication network 20, control, and program the flow of the information in-between.

The remote installation and maintenance system further includes a serial to wireless converter 80 installable to the control module 90, in which the serial to wireless converter 80 enables the information processing device 10 to communicate with the control module 90.

The information processing device 10 communicates with the control module 90, retrieves information from the control module 90, changes the information in the control module 90, and programs the behavior of the control module 90.

The information processing device 10 provides operating modes of test-and-debug, option programming, and firmware-and-software upgrades.

The information processing device 10 includes a PDA with a Palm platform or a regular notebook computer with a standard Windows operating system.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. An installation and maintenance method for maintaining a control module for remote starter and alarm system for vehicles, comprising the steps of:
   a) establishing an electronic connection between the control module and a first information processing device;
   b) obtaining a control information for the control module; and
   c) applying the control information on the control module;
   wherein the step of obtaining a control information comprises the steps of:
   a) establishing a connection between the first information processing device and a second information processing device through a communication network; and
   b) downloading an information from the second information processing device;
   wherein the first information processing device verifies the operation of input and output functions of the control module,
   wherein the first information processing device provides operating modes of test-and-debug, option programming, and firmware-and-software upgrades,
   wherein the mode of option programming allows programming the options and features of the system according to the type of vehicle,
   wherein the options and features are stored as a configuration file either locally in the first information processing device or to the server through the communication network,
   wherein with the off-connection to the control module, the mode of option programming provides selection routine for passing the control of the mode to the program mode screen, passing the control of the mode to diagnostics mode and input screen, connecting the system to the control module.

2. The installation and maintenance method of claim 1, wherein the program mode provides error checking and vehicle dependent programming options.

3. The installation and maintenance method of claim 2, wherein with the on-connection to the control module the mode of option programming provides selection routine for retrying to connect in case of unsuccessful connection, passing the control of the mode to the diagnostics mode and input screen, connecting the system to the control module.

4. The installation and maintenance method of claim 3, wherein in the diagnostic mode and input screen the control module provides the processing device with the status options about the opening parts, braking parts, starting parts, and safety parts.

5. The installation and maintenance method of claim 3, wherein outputs from the control module include information on ignition, starter, accessories, park lights, horn and ground out when running.

6. The installation and maintenance method of claim 3, wherein outputs from the control module include information on lock, unlock, park lights, ignition, horn, and tachometer set point.

* * * * *